UNITED STATES PATENT OFFICE.

NAPOLEON PETINOT, OF NEW YORK, N. Y.

PROCESS FOR PRODUCING ARTICLES OF IRON SILICID.

1,346,333. Specification of Letters Patent. Patented July 13, 1920.

No Drawing. Application filed August 18, 1919. Serial No. 318,325.

*To all whom it may concern:*

Be it known that I, NAPOLEON PETINOT, a citizen of the United States of America, residing in the city of New York, county of New York, and State of New York, have invented certain new and useful Improvements in Processes for Producing Articles of Iron Silicid, of which the following is a full, clear, and exact description.

This invention relates to the manufacture of articles of iron silicid and comprises a novel method whereby the articles have certain properties of better quality than are attainable by the methods heretofore practised.

More particularly my invention discloses an improved way of making articles of iron silicid resistant to corrosion.

It is well known that articles made of iron containing 12% to 15 per cent. of silicon have remarkable resistance to the corrosive action of acids, alkalis, etc., but it has also been observed that the resistance to corrosion is variable, some articles resisting much better than others. I have discovered that if an article of iron containing 12% to 15% ferro-silicon is cast in a mold and allowed to cool slowly its resistance to corrosion is not so great as when it is cast in a mold in which the metal is rapidly chilled. By microscopic examination of those parts of the metal which have yielded to corrosive action I have found carbon present partially in a graphitic form and this apparently was brought about by the action of the silicon upon the carbon during the slow process of cooling.

In carrying out my invention the molten iron silicid containing 10% to 15% of silicon is cast in a graphite mold. Graphite is an excellent conductor of heat and consequently the casting cools so rapidly that the silicon does not have an opportunity to react on the carbon. Thus, I am able to produce castings free from graphitic carbon and which are much more resistant to corrosive action than those made in the ordinary manner. Preferably, the mold is made of graphitized carbon, the kind that is usually known as "Acheson graphite." In the case of small molds these may be made by suitably machining a single graphitized electrode, but when molds too large to be made out of a single graphitized electrode or block are required they are made by machining several blocks and building up the molds with these. The invention, however, is not confined to the use of graphite molds made of graphitized electrodes or blocks for the mold may be made by mixing graphite, natural or artificial with a suitable binder such as molasses or clay and then ramming into flasks. Nor is it necessary in carrying out the invention to use graphite or graphitized blocks in making all parts of the mold since it is only necessary to apply the chilling effect to such parts of the casting as will come in contact with corrosive influences. Thus, for example, in making valves for acid liquids the inside of the valve alone comes in contact with the acid and therefore it is not necessary to make the whole mold of graphite but merely the core.

In the case of relatively large castings the mold made of graphite blocks may be suitably machined so that it can be cooled by means of pipes carrying cooling water.

From the foregoing it will be evident that one of the essential qualities of my invention is to very rapidly chill the molten mass after it has been smelted. While I have described my process as being carried out preferably with a graphite mold, yet it is to be understood that the molds might be as advantageously made of any other material which is as good a conductor of heat as is graphite. I do not wish, therefore, to be understood as limiting myself to the use of graphite.

Having thus described my invention, what I claim is:

1. The process of making articles of iron silicid resistant to corrosion, comprising the casting of the alloy in molds made of graphite.

2. The process of making articles of iron silicid resistant to corrosion, comprising the casting of the alloy in molds made of graphitized carbon.

3. The process of making articles of iron silicid resistant to corrosion, comprising the casting of the alloy in molds made by ramming graphite mixed with a suitable binder in flasks.

4. The process of making articles of iron silicid resistant to corrosion, comprising the casting of the alloy in molds made of graphite cooled by means of water pipes.

5. The process of making articles of iron silicid resistant to corrosion, comprising the casting of the alloy in molds in which those parts that come in contact with the metal that will be subjected to corrosive action are made of graphite.

6. The process of making articles of iron silicid resistant to corrosion, comprising the casting of the alloy in molds in which those parts that come in contact with the metal that will be subjected to corrosive action are made of graphitized carbon.

In testimony whereof, I have hereunto signed my name.

NAPOLEON PETINOT.